UNITED STATES PATENT OFFICE.

SOLOMON GREGER, OF CLEVELAND, OHIO, ASSIGNOR OF ONE-HALF HIS RIGHT TO ADAM HERIG, OF SAME PLACE.

IMPROVEMENT IN COLORING AND TOUGHENING BROOM-STRAW.

Specification forming part of Letters Patent No. 132,961, dated November 12, 1872.

*To all whom it may concern:*

Be it known that I, SOLOMON GREGER, of Cleveland, county of Cuyahoga and State of Ohio, have invented an Improved Process of Coloring, Toughening, and otherwise Improving Broom-Straw, of which the following is a specification:

I take a large vat or caldron suitably placed over a fire, in which I place a quantity of water, and place the straw in it and boil it for about fifteen or twenty minutes, which toughens the fiber of the straw and renders it susceptible of receiving the colors. This I accomplish by subjecting the straw to a boiling process in water containing aniline colors, which coats or colors the straw a clear fixed color.

This process may be varied by having a steam-chamber arranged so that the broom-straw can be placed in it and steamed, the coloring being previously applied to the boiled straw by dipping it into the colors in a liquid state, prepared with a sizing of gum or glue, or by sprinkling the coloring onto the straw, by which a mottled or marbled appearance is given to the straw; then by subjecting the straw to the steaming process the color is fixed to the straw and the fiber toughened, rendering it less liable to be broken. The straw thus treated will not afterward absorb much water, and is thus less liable to rot. It also makes an inferior article of broom-straw better and more serviceable.

Brooms of all kinds made from this improved straw are more durable, elastic, and much neater in appearance, and less liable to retain or show dirt after being used.

I claim as my invention—

The process of coloring, toughening, and improving broom-straw by boiling or steaming with coloring pigments, substantially as described.

S. GREGER.

Witnesses:
 ADAM HERIG,
 D. STEPHAN.